US011233381B2

(12) United States Patent
McGowan et al.

(10) Patent No.: US 11,233,381 B2
(45) Date of Patent: Jan. 25, 2022

(54) ATTACHMENT CLIP, OVERLAND DISTRIBUTION LINE COVER ASSEMBLY, AND METHOD FOR INSTALLING AN OVERLAND DISTRIBUTION LINE COVER TO AN OVERLAND DISTRIBUTION LINE

(71) Applicant: TE Connectivity Ireland Limited, Dublin (IE)

(72) Inventors: Brian McGowan, Quin (IE); Jason Mulligan, Kilcolgan (IE); Brendan Normoyle, Castlemahon (IE)

(73) Assignee: TE Connectivity Ireland Limited, Dublin (IE)

( * ) Notice: Subject to any disclaimer, the term of this patent is extended or adjusted under 35 U.S.C. 154(b) by 0 days.

(21) Appl. No.: 16/896,680

(22) Filed: Jun. 9, 2020

(65) Prior Publication Data
US 2020/0303911 A1 Sep. 24, 2020

Related U.S. Application Data

(63) Continuation of application No. PCT/EP2018/085969, filed on Dec. 19, 2018.

(30) Foreign Application Priority Data

Dec. 21, 2017 (EP) .................................. 17209658

(51) Int. Cl.
*H02G 3/04* (2006.01)
*H01B 17/56* (2006.01)

(52) U.S. Cl.
CPC .......... *H02G 3/0418* (2013.01); *H01B 17/56* (2013.01)

(58) Field of Classification Search
CPC ............ H04B 2203/5487; H01B 17/00; H01B 19/00; H01B 17/56; H01R 12/712; H01R 13/443; H01R 13/502; H01R 13/5202; H01R 24/62; H01R 25/003; H01R 27/02
USPC ............................ 174/5 R, 40 R, 139, 138 F
See application file for complete search history.

(56) References Cited

U.S. PATENT DOCUMENTS

| 344,324 A | * | 6/1886 | Munsie | ................ | H02G 3/0418 |
| | | | | | 174/68.3 |
| 541,552 A | * | 6/1895 | Kingdon | ............... | H02G 3/0418 |
| | | | | | 174/101 |
| 1,822,128 A | * | 9/1931 | Clayton | ............... | H02G 3/0683 |
| | | | | | 174/663 |

(Continued)

FOREIGN PATENT DOCUMENTS

| CN | 1757146 A | 4/2006 |
| CN | 202653073 U | 1/2013 |

(Continued)

OTHER PUBLICATIONS

The First Office Action, China National Intellectual Property Administration, dated Dec. 17, 2020, 18 pages.

(Continued)

*Primary Examiner* — Krystal Robinson
(74) *Attorney, Agent, or Firm* — Barley Snyder (57) ABSTRACT

An attachment clip for an overland distribution line cover includes an eye receiving an electrical line, an opening for insertion of the electrical line, an intermediate section connecting the opening with the eye, and a snap-fit member fixing the attachment clip to the overland distribution line cover.

20 Claims, 8 Drawing Sheets

(56) References Cited

U.S. PATENT DOCUMENTS

| | | | | |
|---|---|---|---|---|
| 2,339,093 | A * | 1/1944 | Metheny | F16L 3/1233 248/74.3 |
| 3,328,511 | A * | 6/1967 | Cagle | H02G 7/00 174/45 R |
| 3,393,350 | A * | 7/1968 | Goudy | H02G 3/0418 361/627 |
| 4,814,584 | A * | 3/1989 | Bohlender | H05B 3/14 219/505 |
| 5,141,447 | A * | 8/1992 | Poirier | H01R 25/162 439/207 |
| D331,916 | S * | 12/1992 | DuBrucq | D13/155 |
| 5,523,529 | A * | 6/1996 | Holliday | H02G 3/0418 138/163 |
| 5,873,324 | A * | 2/1999 | Kaddas | A01M 29/26 119/174 |
| 6,126,459 | A * | 10/2000 | Reddy | H05K 1/119 439/247 |
| 6,730,852 | B1 * | 5/2004 | Puigcerver | H01B 17/58 174/138 F |
| 6,924,432 | B1 * | 8/2005 | Connors | H02G 3/22 174/19 |
| 7,154,036 | B2 * | 12/2006 | Lynch | H02G 7/00 174/5 R |
| 7,297,869 | B2 * | 11/2007 | Hiller | H01B 17/00 119/174 |
| 7,375,280 | B2 * | 5/2008 | VanderVelde | H02G 3/0418 138/111 |
| 8,618,412 | B2 * | 12/2013 | Lynch | H01B 17/00 174/5 R |
| 8,621,735 | B2 * | 1/2014 | Niles | H02G 7/00 29/270 |
| 8,627,613 | B2 * | 1/2014 | Parker | A01M 29/32 52/101 |
| 8,796,546 | B2 * | 8/2014 | Lynch | H01B 17/00 174/5 R |
| 8,907,222 | B2 * | 12/2014 | Stransky | H02G 3/0418 174/138 F |
| 9,938,729 | B2 * | 4/2018 | Coon | E04F 17/08 |
| 10,003,182 | B2 * | 6/2018 | Newman | H01B 17/00 |
| 10,263,402 | B2 * | 4/2019 | Niles | H02G 1/085 |
| 2005/0073200 | A1 * | 4/2005 | Divan | H01F 30/16 307/44 |
| 2014/0076604 | A1 * | 3/2014 | Frye | H02G 3/0481 174/68.3 |
| 2016/0172829 | A1 | 6/2016 | Hiller et al. | |
| 2016/0233010 | A1 * | 8/2016 | Hiller | H01B 19/00 |

FOREIGN PATENT DOCUMENTS

| | | |
|---|---|---|
| CN | 203504096 U | 3/2014 |
| DE | 9414366 U1 | 10/1994 |
| DE | 29804595 U1 | 7/1998 |

OTHER PUBLICATIONS

Abstract of CN 203504096, dated Mar. 26, 2014, 1 page.
Abstract of CN 202653073, dated Jan. 9, 2013, 1 page.
Extended European Search Report, dated Jun. 29, 2018, 8 pages.
PCT Notification, The International Search Report and the Written Opinion of the International Searching Authority, dated Mar. 7, 2019, 12 pages.
European Patent Office, dated Mar. 15, 2021, 6 pages.

* cited by examiner

ATTACHMENT CLIP, OVERLAND DISTRIBUTION LINE COVER ASSEMBLY, AND METHOD FOR INSTALLING AN OVERLAND DISTRIBUTION LINE COVER TO AN OVERLAND DISTRIBUTION LINE

CROSS-REFERENCE TO RELATED APPLICATIONS

This application is a continuation of PCT International Application No. PCT/EP2018/085969, filed on Dec. 19, 2018, which claims priority under 35 U.S.C. § 119 to European Patent Application No. 17209658.8, filed on Dec. 21, 2017.

FIELD OF THE INVENTION

The present invention relates to an attachment clip and, more particularly, to an attachment clip for an overland distribution line cover.

BACKGROUND

Overland distribution lines are used to distribute electricity, particularly in rural areas. One problem associated with such overland distribution line systems is that large birds can touch two phases of the electrical network simultaneously, causing them severe injury and/or damaging power line assets. This is avoided by the use of overland distribution line covers that cover the electrical lines, especially at posts where birds tend to rest. The current solutions, however, are either difficult to install or difficult to manufacture.

SUMMARY

An attachment clip for an overland distribution line cover includes an eye receiving an electrical line, an opening for insertion of the electrical line, an intermediate section connecting the opening with the eye, and a snap-fit member fixing the attachment clip to the overland distribution line cover.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

Figure 1:
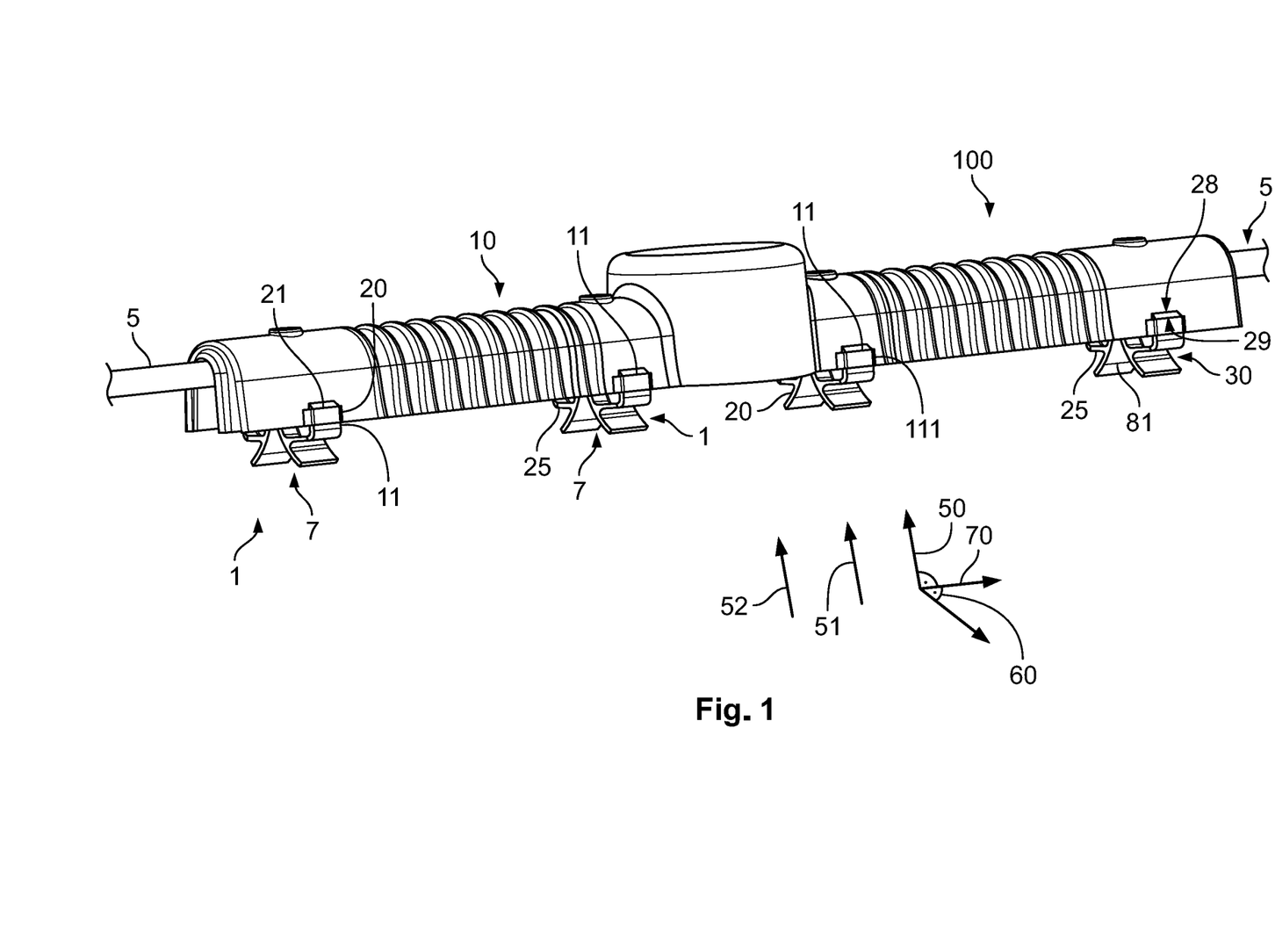
FIG. 1 is a perspective view an overland distribution line cover assembly according to an embodiment installed over an electrical line.

An overland distribution line cover assembly 100 according to an embodiment is shown in FIG. 1 in an installed state. In order to protect an electrical line 5 that can, in an embodiment, be an overland distribution line that is used for distributing electricity, for example in rural areas, an overland distribution line cover assembly 100 is used. The electrical lines 5 used for overland electrical distribution are usually not insulated on the outside, and different phases are located in close proximity so that large birds could possibly come into contact with two different phases simultaneously and be electrocuted. To avoid this, the electrical line 5 is covered with the overland distribution line cover assembly 100 that is made from insulating material, such as a plastic and/or a polymeric material, and is installed around posts where birds tend to land in order to rest.

The inventive solution is not limited to use in overland distribution lines 5, but can also be used in further applications in which an easy-to-install cover for an electrical line 5 is advantageous. In the following, when the terms "electrical line" and "cover" will be used they refer to an overland distribution line or a overland distribution line cover. However, the terms can also relate to other types of electrical lines and covers. For example, the concept could be applied to overland or underground bare cable, i.e. in tunnels in mining or rail applications.

In FIG. 1, the overland distribution line cover assembly 100 is already fully installed over the electrical line 5. In this state, the electrical line 5 is no longer accessible, at least from above.

Attachment clips 1, shown in FIG. 1, are used for fixing an overland distribution line cover 10 to the electrical line 5. In the shown embodiment, the overland distribution line cover assembly 100 comprises four attachment clips 1. However, the number of attachment clips 1 can vary depending on the application. Furthermore, additional modules or covers 10 that are either identical or similar to the one depicted in FIG. 1 can be added at one of the ends of the depicted overland distribution line cover 10 to provide protection over a greater length. Thus, the solution is modular and different lengths can be covered by simply adding further modular covers 10.

Figure 2:
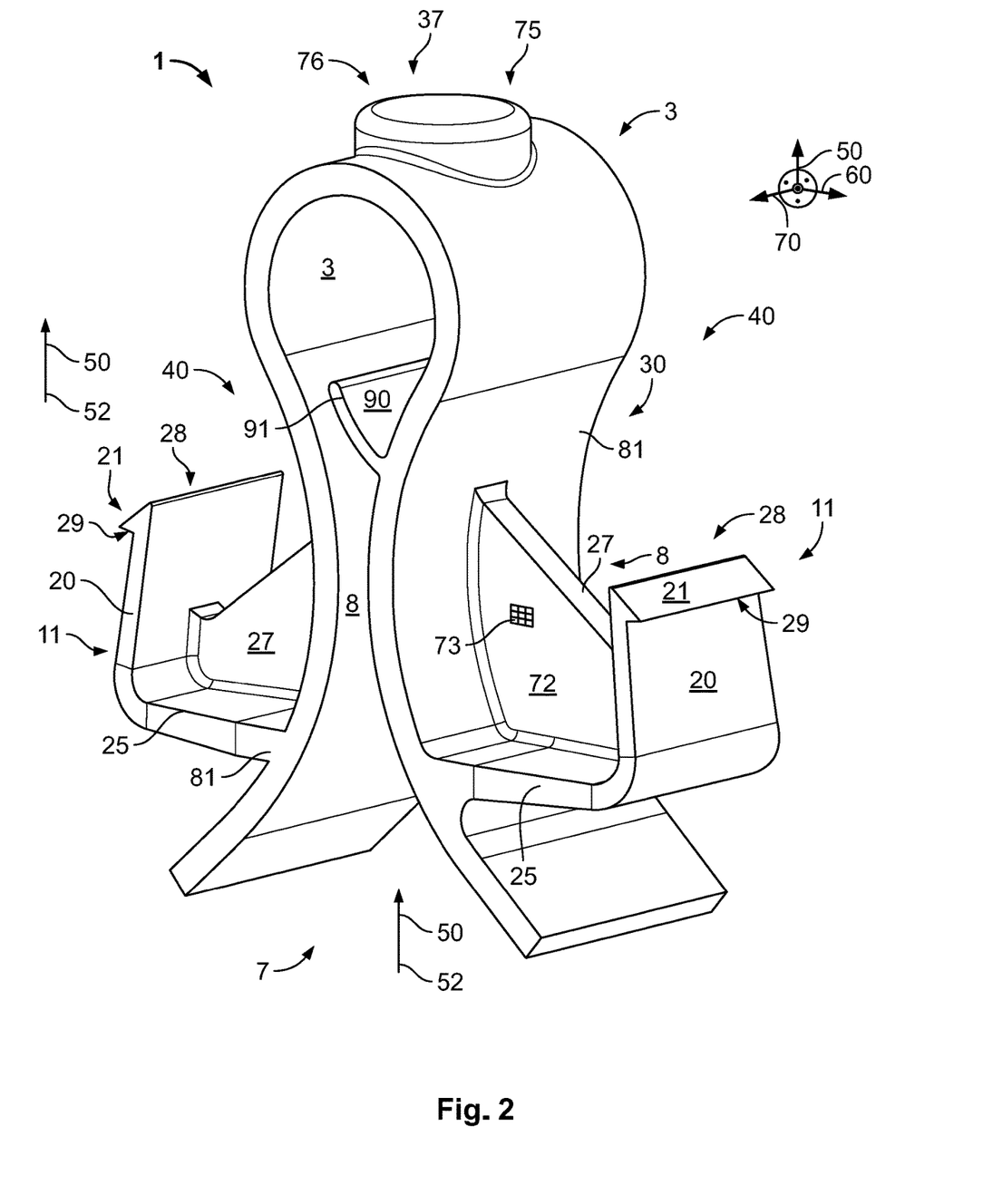
FIG. 2 is a perspective view of an attachment clip of the overland distribution line cover assembly.

The attachment clip 1, as shown in FIG. 2, has an eye 3 for receiving the electrical line 5. The eye 3 has an at least partially cylindrical shape to accommodate cylindrical electrical lines 5. The attachment clip 1 has an opening 7 for insertion of the electrical line 5, and an intermediate section 8 that connects the opening 7 with the eye 3. The electrical line 5 can thus be inserted into the opening 7 and is then guided through the intermediate section 8 into the eye 3.

The attachment clip 1, as shown in FIG. 2, has a snap-fit member 11 for fixing the attachment clip 1 to the overland distribution line cover 10. The attachment clip 1 be located at least partially in a space surrounded by the cover 10, thus allowing for a compact design. The snap-fit member 11 enables easy attachment. Further, if desired, the attachment clip 1 can also be removed from the cover 10, for example if the attachment clip 1 is broken and has to be exchanged or the cover 10 is supposed to be used for a different application in which a different attachment clip 1 should be used. Different attachment clips 1 can, for example, differ in the size of the eye 3, so that differently sized electric lines 5 can be accommodated safely. In this embodiment, the snap-fit member 11 is located at an outer side 40 of the attachment clip 1, so that the attachment clip 1 can easily be connected to the cover 10. In an alternative configuration, the snap-fit member 11 could be located at other part of the attachment clip 1, for example at an inner side of the attachment clip 1.

The attachment clip 1, as shown in FIG. 2, has a base body 30 that in this embodiment includes the opening 7, the intermediate section 8, and the eye 3. The base body 30 has roughly the shape of the Greek letter omega. The attachment clip 1 has only strip-like, flat sections to achieve a lightweight construction. In an alternative embodiment, the attachment clip 1 can have a shape that is different from an omega. For example, the shape can have straight sections and resemble a keyhole.

The attachment clip 1 can be an injection molded part made from a plastic, polymeric, or composite material. The depicted embodiment has a monolithic construction, meaning that the entire attachment clip 1 is one single piece made from one single material. This simplifies production.

The electrical line 5 can be inserted into the attachment clip 1 along an insertion direction 50 shown in FIG. 2, in particular a line insertion direction 51 that runs from the opening 7 through the intermediate section 8 to the eye 3. The electrical line 5 is then held in the eye 3. The attachment clip 1 has a retaining member 90 embodied as a snap member 91 to retain the electrical line 5 in the eye 3. The retaining member 90 is embodied as a flap with a free end that can be deflected elastically and snaps into place behind the electrical line 5 once it is located in the eye 3.

The snap-fit member 11 has a deflection arm 20, as shown in FIG. 2. A securing nose 21 is located at a free end 28 of the deflection arm 20. The securing nose 21 protrudes perpendicularly to the insertion direction 50. The deflection arm 20 extends in the insertion direction 50 and is deflectable perpendicular to the insertion direction 50.

The snap-fit member 11 can thus cooperate with a corresponding counter snap-fit member 111 on the cover 10, as shown in FIG. 1. To ensure that the two engage safely, the snap-fit member 11 has a stop face 29 located at the securing nose 21, the stop face 29 facing against the clip insertion direction 52. Thus, a form fit or positive fit is achieved once the snap-fit member 11 engages with the counter snap-fit member 111. The deflection arm 20 is deflected during insertion of the attachment clip 1 into the cover 10 towards the intermediate section 8, and the securing nose 21 snaps back once the attachment clip 1 has been fully inserted into the cover 10.

To space the deflection arm 20 away from further parts of the attachment clip 1 and to thereby ensure easy insertion into the cover 10, the attachment clip 1 comprises a spacing arm 25, as shown in FIG. 2. The spacing arm 25 runs substantially in a lateral direction 60 that is perpendicular to the insertion direction 50 and perpendicular to an extension direction 70 of the electrical line 5. In the embodiment shown here, the deflection arm 20 is slightly inclined to the insertion direction 50. The two deflection arms 20 form a wedge to simplify the insertion into the cover 10.

The attachment clip 1, as shown in FIG. 2, has a reinforcement web 27, so that the spacing arm 25 cannot move relative to the further parts during insertion; the further parts here refer in particular to the intermediate section 8, the eye 3, and the opening 7. The spacing reinforcement web 27 is embodied as a flat element 72. The flat element 72 is planar and the plane 73 of the flat element 72 is perpendicular to an extension direction 70 of the electrical line 5. The plane 73 thus is parallel to the insertion direction 50 and the lateral direction 60, and can thus provide stability along these two directions, especially during insertion of the electrical line 5 into the attachment clip 1 and insertion of the attachment clip 1 into the cover 10. The reinforcement web 27 ends in a connection region between the deflection arm 20 and the spacing arm 25, so that it is still possible to deflect the deflection arm 20 while providing sufficient stability for the spacing arm 25.

At the intermediate section 8, as shown in FIG. 2, the attachment clip 1 comprises elastically deflectable legs 81 that can be elastically deflectable against or relative to each other to allow insertion of the electrical line 5.

As shown in FIG. 2, the attachment clip 1 comprises two snap-fit members 11 that are located symmetrically on opposite sides of the attachment clip 1 to allow a good distribution of forces during an insertion process. Each of the snap-fit members 11 is attached to one elastically deflectable leg 81 so that the snap-fit members 11 and the cover 10 are automatically spread apart and separated when the electrical line 5 is inserted. The snap-fit members 11 protrude away from the elastically deflectable legs 81 so that sufficient space is available when the cover 10 is attached to the attachment clip 1. This makes installation easy.

The attachment clip 1 has a positioning member 75, shown in FIG. 2, that is adapted for positioning the attachment clip 1 in the cover 10 along an extension direction 70 of the electrical line 5. The positioning member 75 also positions the attachment clip 1 in the lateral direction 60. The positioning member 75 is located at a center 37 of a front section of the eye 3. Due to its proximity to the eye 3, the cable 5 is automatically positioned when the attachment clip 1 is positioned using the positioning member 75.

The positioning member 75 has a protrusion 76 shown in FIG. 2 that protrudes in the insertion direction 50, especially the line insertion direction 51 along which the electrical line 5 is inserted into the attachment clip 1. Due to the insertion forces used to insert the electrical line 5 into the attachment clip 1, the protrusion 76 is automatically brought into and held in engagement with a recess 105 acting as a counter element on the cover 10, shown in FIG. 3. In an alternative embodiment, the positioning member 75 could protrude to a side. In a further alternative embodiment, the positioning member 75 can be a recess on the attachment clip 1 that cooperates with a protrusion on the cover 10.

When the positioning member 75 is located on the eye 3, the lever forces acting on the attachment clip 1 are low due to the proximity to the electric line 5 and the eye 3. The positioning member 75 can, especially, be located centrally at the attachment clip 1 to achieve a good positioning effect. The positioning member 75 can, for example, be located symmetrically to a symmetry axis or symmetry plane of the attachment clip 1.

The attachment clip 1 can, in one embodiment, be substantially symmetrical. This can allow an easy assembly of the overland distribution line cover assembly 100, as the attachment clip 1 can be inserted in several equivalent insertion positions without the need to adjust the rotational position before insertion. In an alternative embodiment, the attachment clip 1 is not symmetric. This can for example ensure that the correct orientation during assembly. For example, if more than one snap-fit member 11 is present, the two can be different. Further, for example positioning members 75 can be offset relative to the extension direction 70 of the overland distribution line cover 10 and/or the cable 5.

Figure 3:
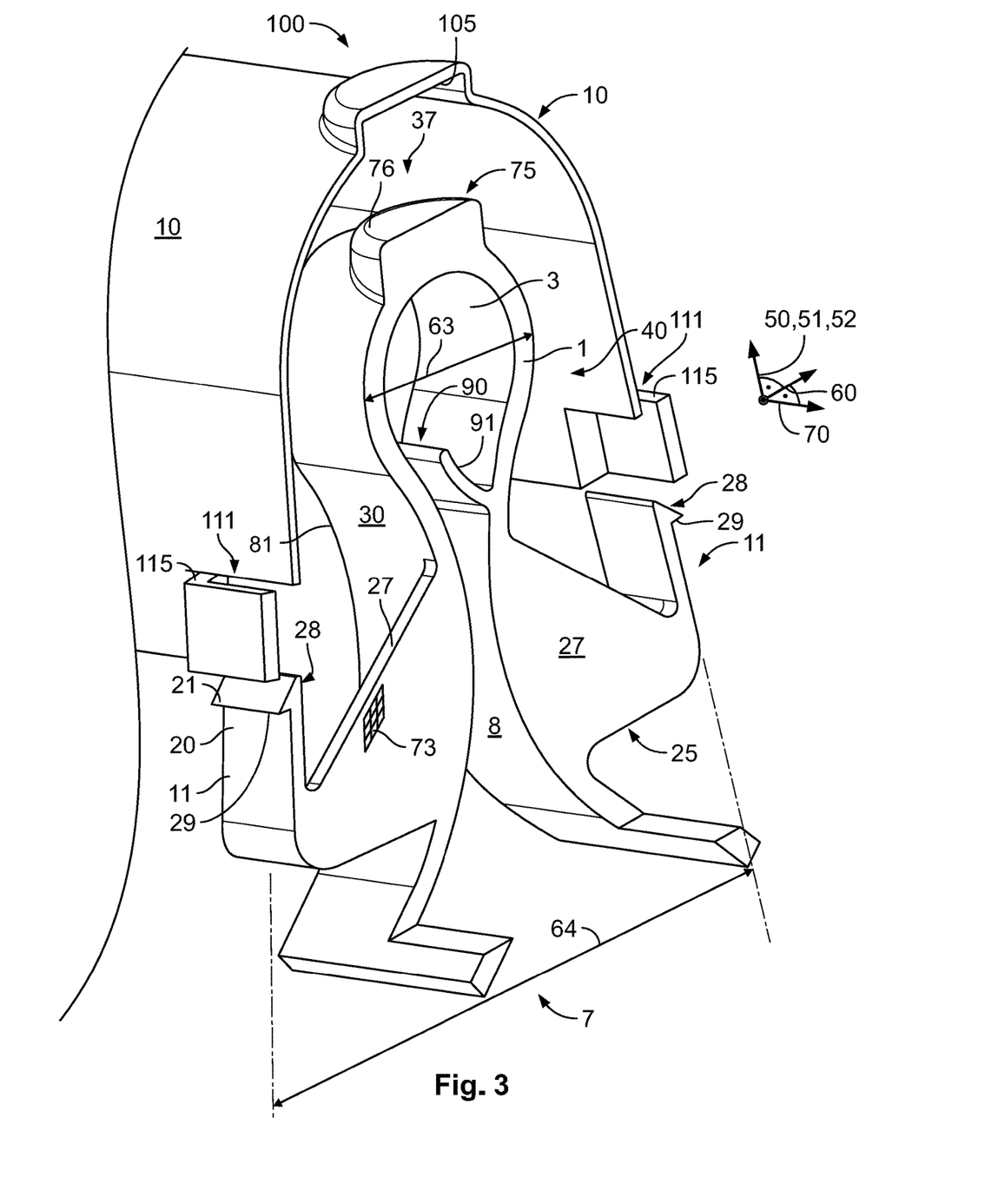
FIG. 3 is a sectional perspective view of the attachment clip during insertion into a cover of the overland distribution line cover assembly.

FIGS. 3-6 show different steps of the installation process. FIG. 3 shows a sectional view of a step in which the attachment clip 1 is inserted along the clip insertion direction 52 into the cover 10. The cover 10 has counter snap-fit members 111 that are brought into engagement with the snap-fit member 11 on the attachment clip 1.

Figure 4:
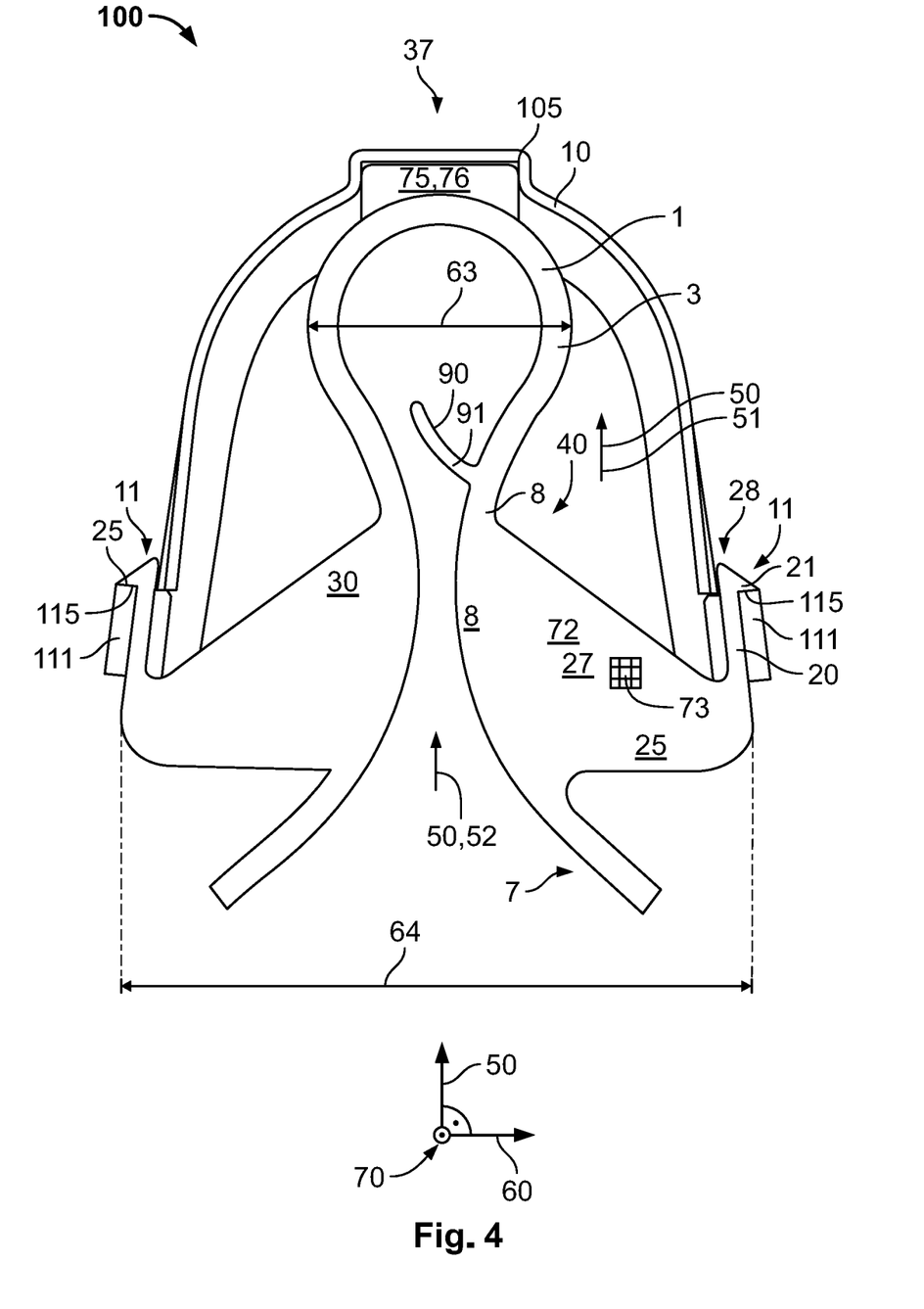
FIG. 4 is a sectional side view of the attachment clip in the cover.

Once the attachment clip 1 is fully inserted into the cover 10 as can, for example, be seen in FIG. 4, the two are fixed to each other by the snap-fit members 11 and the counter snap-fit elements 111. The stop faces 29 abut counter stop faces 115 on the counter snap-fit member 111. Further, the attachment 1 is safely positioned in the cover 10 by the positioning member 75 that engages with the recess 105. As can be seen, each of the snap-fit members 11 protrudes further in the lateral direction 60 than the eye 3. A width 64 in the lateral direction 60, measured at the location of the snap-fit members 11, is greater than a width 63 at the eye 3.

Figure 5:
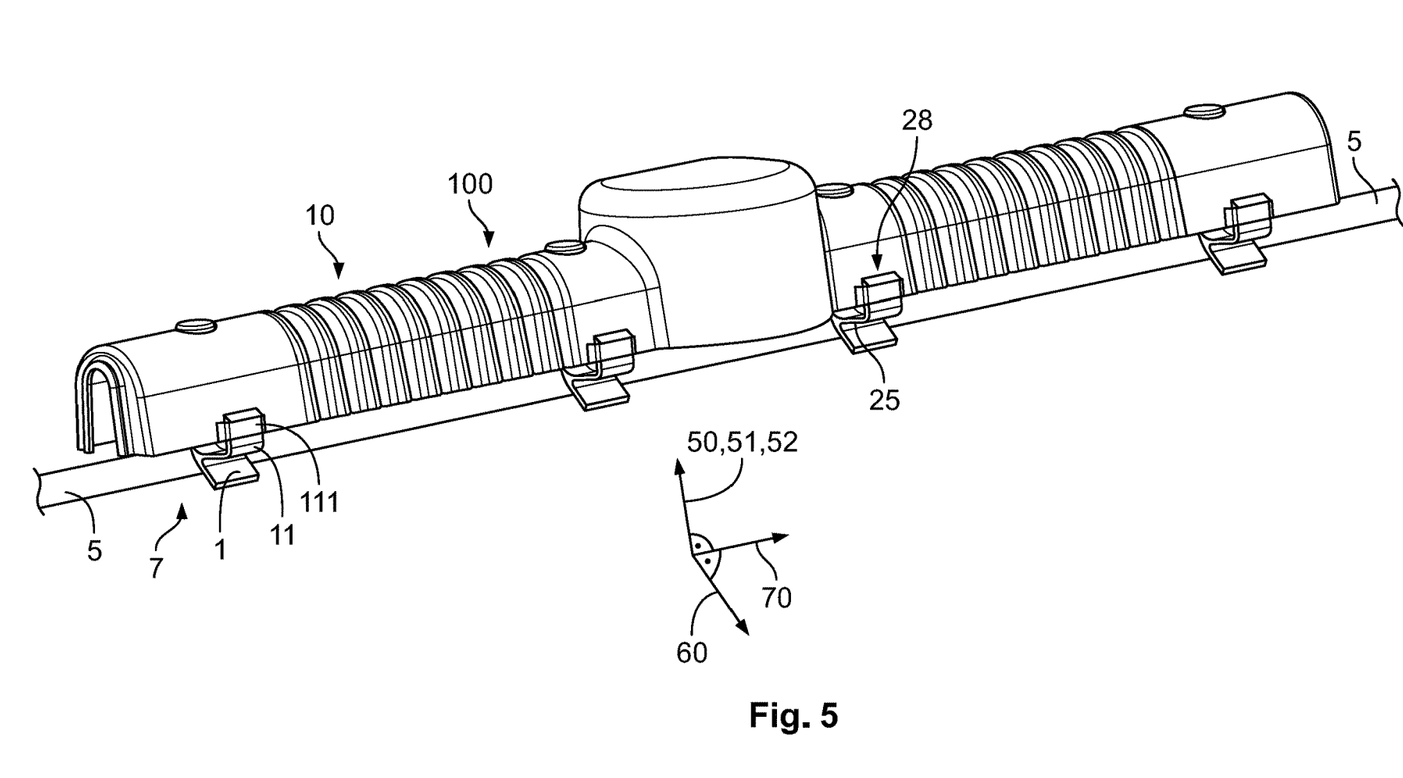
FIG. 5 is a perspective view of a step in the installation of the overland distribution line cover assembly onto the electrical line.

The overland distribution line cover assembly 100 can now be slid over the electrical line 5, as shown in FIG. 5. This can easily be achieved using a hot stick method, meaning that the overland distribution line cover assembly 100 can be pushed over the electrical line in a simple step, e.g. using an insulated stick. This method requires no additional safety measures such as switching off the electricity or providing further coverings for covering the lines of the other phases. The electric line 5 is simply inserted into the overland distribution cover line assembly 100 along the line insertion direction 51, which is parallel to the clip insertion direction 52, both thus forming a common insertion direction 50. The overland distribution line 5 can, in particular, be adapted to allow movement of the deflection arm 20 during the insertion.

Figure 6:
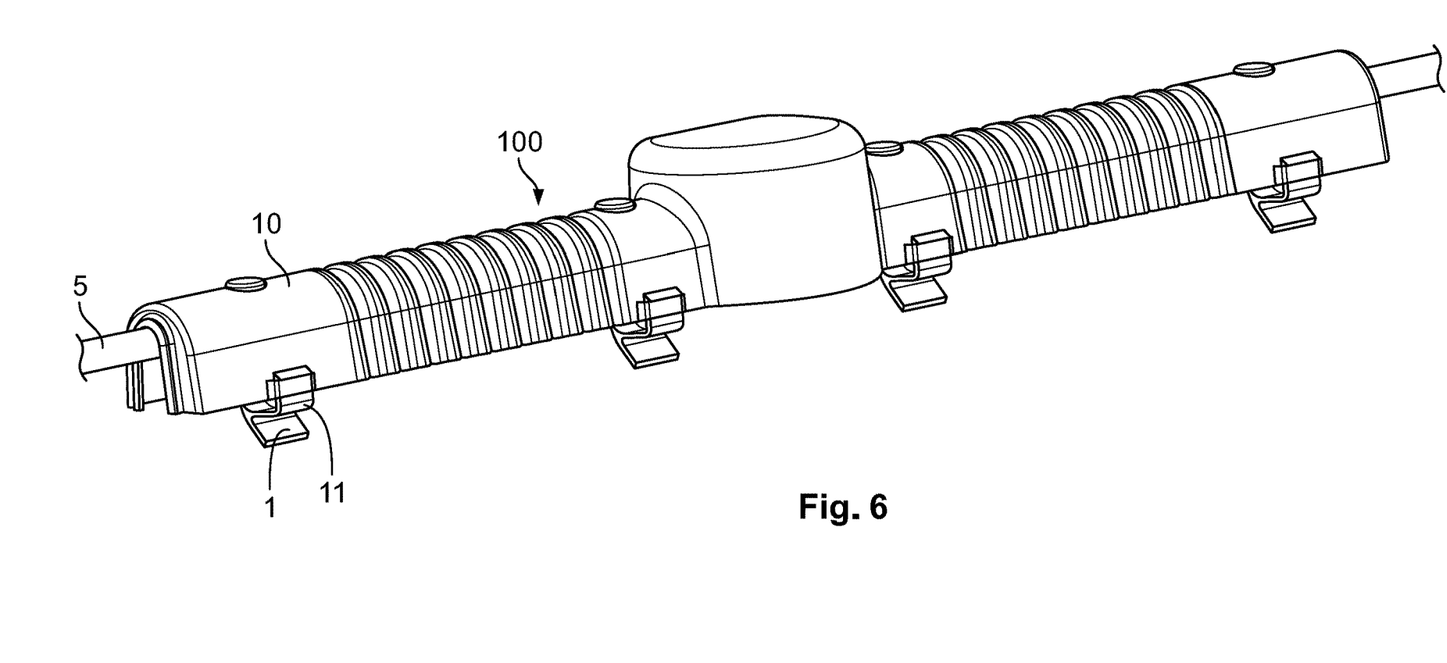
FIG. 6 is a perspective view of a further step in the installation of the overland distribution line cover assembly onto the electrical line.

FIG. 6 shows the overland distribution line cover assembly 100 after installation has been completed. The electrical line 5 is now held in place and positioned in the cover 10 by the attachment clips 1.

Figure 7:
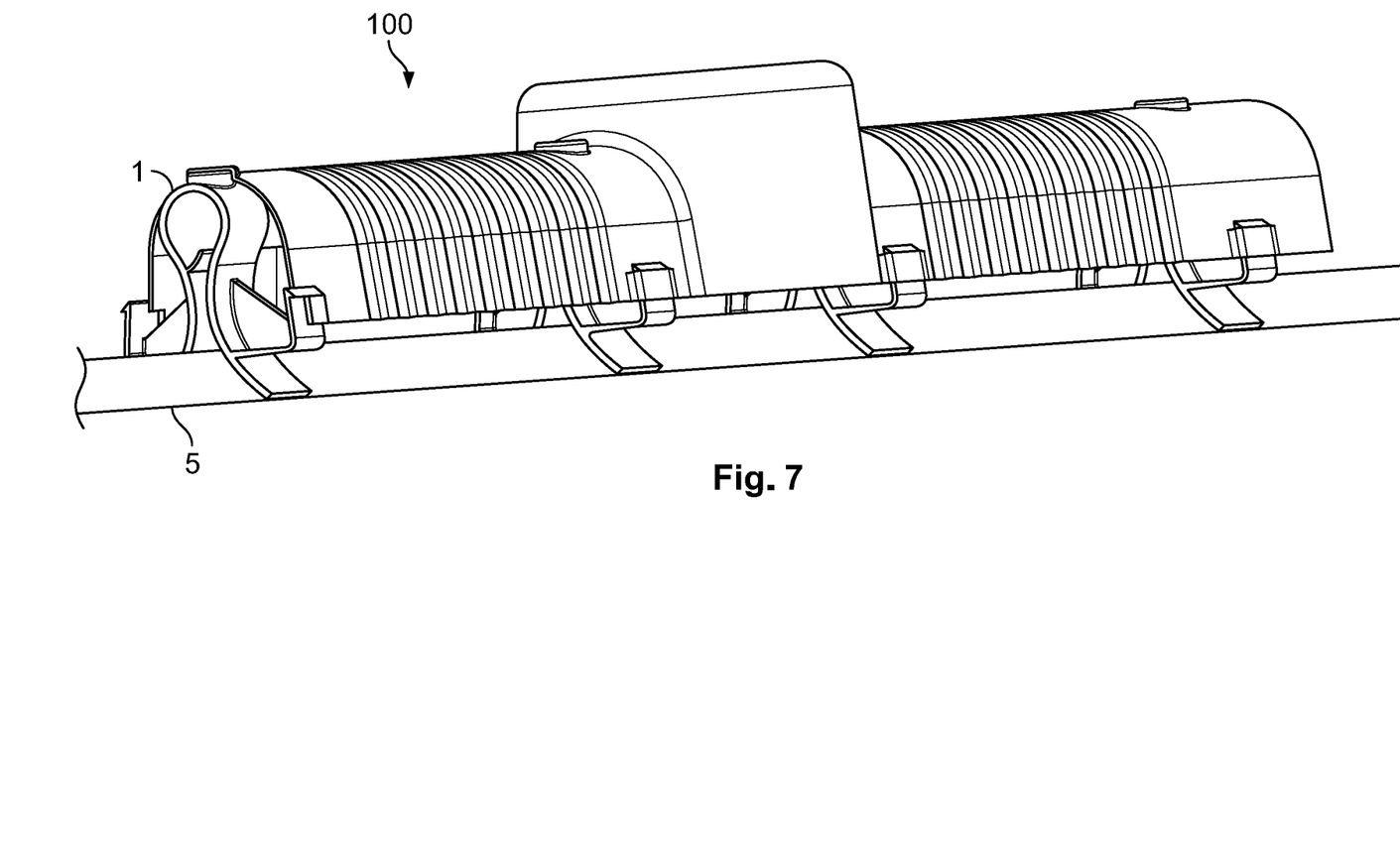
FIG. 7 is a sectional perspective view of the step of FIG. 5.
Figure 8:
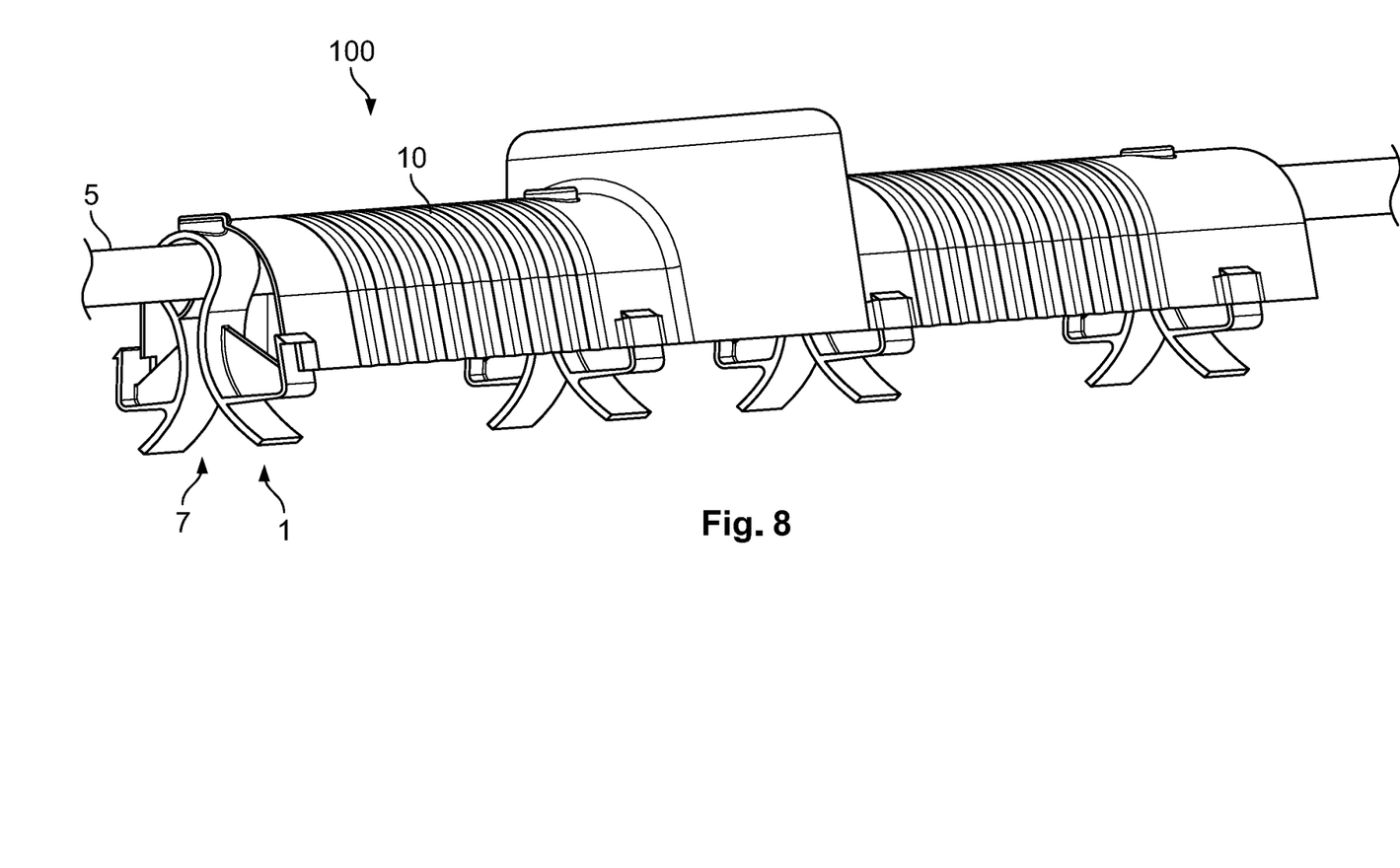
FIG. 8 is a sectional perspective view of the step of FIG. 6.

FIGS. 7 and 8 show further views of the installation steps depicted in FIGS. 5 and 6, in which parts of the overland distribution line cover 10 have simply been removed and/or cut away so that the details are visible.

The inventive solution allows an easy installation of the overland distribution line cover assembly 100. The attachment clip 1 can, for example, be attached to the overland distribution line cover 10 in a production environment remote from the location of installation and, in particular, before the installation. During the later installation process, the overland distribution line cover assembly 100 need only be slid over the overland distribution line 5 and no further steps are necessary. The attachment clip 1 and the overland distribution line cover 10 can be produced separately, each in a one-step production process, unlike a previous solution in which the attachment clip 1 had to be placed in a mold so that it was automatically integrated into a cover 10 during the subsequent molding of the cover 10. The fact that the attachment clip 1 and the cover 10 are two separate elements also allows a modular use. For example, differently shaped attachment members can be produced and attached to the same cover 10 depending on the desired application. Moreover, the overland distribution line cover assembly 100 can be installed on an energized line using a hot stick. The modular design enables the overland distribution line cover assembly 100 to be used for either live or dead line applications. The addition of the attachment clips 1 enables the safer hot stick application.

What is claimed is:

1. An attachment clip for an overland distribution line cover, comprising:
   an eye receiving an electrical line;
   an opening for insertion of the electrical line;
   an intermediate section connecting the opening with the eye, the intermediate section has an elastically deflectable leg; and
   a snap-fit member fixing the attachment clip to the overland distribution line cover, the snap-fit member is fixed to and extends from the elastically deflectable leg.

2. The attachment clip of claim 1, wherein the snap-fit member has a deflection arm with a securing nose protruding perpendicular to an insertion direction.

3. The attachment clip of claim 2, wherein the deflection arm extends in the insertion direction and is deflectable perpendicular to the insertion direction.

4. The attachment clip of claim 2, wherein the snap-fit member has a spacing arm spacing the deflection arm from a plurality of further parts of the attachment clip.

5. The attachment clip of claim 4, wherein the snap-fit member has a reinforcement web for the spacing arm.

6. The attachment clip of claim 5, wherein the reinforcement web is a flat element with an extension plane perpendicular to an extension direction of the electrical line.

7. The attachment clip of claim 1, wherein the snap-fit member protrudes further in a lateral direction than the eye.

8. The attachment clip of claim 1, further comprising an omega-shaped base body.

9. The attachment clip of claim 1, wherein the snap-fit member is one of a pair of snap-fit members and the intermediate section has a pair of elastically deflectable legs opposite each other, one of the pair of snap-fit members protrudes from each of the elastically deflectable legs.

10. The attachment clip of claim 1, further comprising a positioning member positioning the attachment clip in the overland distribution line cover.

11. The attachment clip of claim 10, wherein the positioning member has a protrusion protruding in an insertion direction.

12. The attachment clip of claim 11, wherein the positioning member is disposed on the eye.

13. The attachment clip of claim 1, further comprising a retaining member retaining the electrical line in the eye.

14. The attachment clip of claim 1, wherein the snap-fit member is formed in a single piece with the elastically deflectable leg.

15. An overland distribution line cover assembly for covering an overland distribution line, comprising:
   an overland distribution line cover; and
   an attachment clip including an eye receiving an electrical line, an opening for insertion of the electrical line, an intermediate section connecting the opening with the eye, and a snap-fit member fixing the attachment clip to the overland distribution line cover, the intermediate section has an elastically deflectable leg, the snap-fit member is fixed to and extends from the elastically deflectable leg.

16. The overland distribution line cover assembly of claim 15, wherein the overland distribution line cover has a counter snap-fit member cooperating with the snap-fit member of the attachment clip.

17. A method for installing an overland distribution line cover to an overland distribution line, comprising:

snap-fitting an attachment clip to the overland distribution line cover, the attachment clip has an elastically deflectable leg and a snap-fit member fixed to and extending from the elastically deflectable leg, the snap-fit member engages the overland distribution cover.

18. An attachment clip for an overland distribution line cover, comprising:

an eye receiving an electrical line;

an opening for insertion of the electrical line;

an intermediate section connecting the opening with the eye; and a snap-fit member fixing the attachment clip to the overland distribution line cover, the snap-fit member has a deflection arm with a securing nose protruding perpendicular to an insertion direction, the snap-fit member has a spacing arm spacing the deflection arm from a plurality of further parts of the attachment clip.

19. The attachment clip of claim 18, wherein the snap-fit member has a reinforcement web for the spacing arm.

20. The attachment clip of claim 19, wherein the reinforcement web is a flat element with an extension plane perpendicular to an extension direction of the electrical line.

* * * * *